United States Patent
Vandenbossche

(10) Patent No.: US 6,989,617 B1
(45) Date of Patent: Jan. 24, 2006

(54) COMMAND COMPONENT ASSEMBLY FOR ALTERNATOR TO AUTOMATIC VEHICLE

(75) Inventor: Mathieu Vandenbossche, Le Touquet (FR)

(73) Assignee: Valeo Equipments Electriques Moteur, Creteil (FR)

( * ) Notice: Subject to any disclaimer, the term of this patent is extended or adjusted under 35 U.S.C. 154(b) by 0 days.

(21) Appl. No.: 09/583,583

(22) Filed: Oct. 23, 2000

(51) Int. Cl.
H02K 11/00 (2006.01)

(52) U.S. Cl. .................. 310/68 D; 310/52; 310/59; 310/65; 310/227; 310/249; 310/248; 310/64

(58) Field of Classification Search .......... 310/239, 310/52–65, 227, 91, 219, 238; 165/185
See application file for complete search history.

(56) References Cited

U.S. PATENT DOCUMENTS

| | | | | |
|---|---|---|---|---|
| 4,469,968 A | * | 9/1984 | Jaeschke | 310/105 |
| 4,538,169 A | | 8/1985 | Smith et al. | 357/76 |
| 4,670,678 A | * | 6/1987 | Jager et al. | 310/64 |
| 4,990,811 A | * | 2/1991 | Nakata et al. | 310/239 |
| 5,536,972 A | | 7/1996 | Kato | 257/706 |
| 5,619,108 A | * | 4/1997 | Komurasaki et al. | 318/140 |
| 5,675,205 A | | 10/1997 | Jacob et al. | 310/239 |
| 5,712,517 A | * | 1/1998 | Schmidt et al. | 310/45 |
| 6,172,434 B1 | * | 1/2001 | Oohashi et al. | 310/71 |
| 6,903,472 B2 | * | 6/2005 | Ogi | 310/68 D |
| 2003/0197437 A1 | * | 10/2003 | Horioka et al. | 310/68 D |
| 2004/0012274 A1 | * | 1/2004 | Aeschlimann et al. | 310/68 D |
| 2005/0168082 A1 | * | 8/2005 | Kondo et al. | 310/68 D |

FOREIGN PATENT DOCUMENTS

| | | |
|---|---|---|
| DE | 19811601 | 4/1999 |
| EP | 0350593 | 1/1990 |
| EP | 0682467 | 11/1995 |
| EP | 0731550 | 9/1996 |
| EP | 0792769 | 9/1997 |
| JP | 57003562 | 1/1982 |
| JP | 57164541 | 10/1982 |

* cited by examiner

Primary Examiner—Darren Schuberg
Assistant Examiner—J. Aguirrechea
(74) Attorney, Agent, or Firm—Berenato, White & Stavish

(57) ABSTRACT

A brush holder for a vehicle electrical machine having an insulating support, an electrical circuit including a semiconductor control component; and at least one metallic heat dissipation member in contact with the ambient environment and arranged to receive heat from the control component. The dissipation member is composed of two distinct parts, a seat and a dissipator. The seat is fixed to the support and receiving, on one of its faces, the control component and, on the other one of its faces, the dissipator.

11 Claims, 3 Drawing Sheets

COMMAND COMPONENT ASSEMBLY FOR ALTERNATOR TO AUTOMATIC VEHICLE

BACKGROUND OF THE INVENTION

1. Field of the Invention.

The invention concerns brush holders for a vehicle electrical machine, notably for an alternator, alternator/starter and starter.

2. Description of the Related Art.

There is known, through the document U.S. Pat. No. 5,675,205, in accordance with the preamble to claim 1, such a brush holder provided with an insulating support, a metallic seat and a semiconductor control component. This component is mounted on the seat by means of an opening in the support. This opening is therefore closed by the seat, as well as by a cover in order to form a casing housing the component.

The seat belongs to a heat dissipation means. More precisely, in this brush holder, the heat generated by the control component is transferred to the seat, and then from the seat it is transferred to the outside by conduction or convection. This dissipation may prove insufficient and give rise to overheating reducing the service life of the brush holder and component.

In order to discharge the heat better, it may be thought to modify the cover of the casing so that the latter constitutes a heat dissipator belonging to the heat dissipation means as visible for example in FIGS. 2 and 5 of the document EP-A-0 731 550 (U.S. Pat. No. 5,686,780).

The Applicant has wondered whether it is possible to increase still further the efficacy of the heat dissipation means, and this in a simple and economical fashion.

SUMMARY OF THE INVENTION

Therefore one aim of the invention is to provide a brush holder affording an even better discharge of the heat in a reliable, simple and economical fashion.

With a view to achieving this aim, there is provided according to the invention a brush holder for a vehicle electrical machine having a support, a metallic seat fixed to the support, an electrical circuit comprising at least one semiconductor control component, in which the seat on the one hand receives for fixing on one of these faces the control component by means of an opening in the support and on the other hand belongs to a heat dissipation means in contact with the ambient environment and arranged to receive heat from the control component, characterised in that the said seat receives on the other one of its faces a heat dissipator so that the heat dissipation means is composed of two distinct and adjacent parts.

Thus one part of the dissipation means, forming a dissipator, fulfils solely the function of discharge of heat. It can therefore be freely designed so as to discharge a large quantity of heat rapidly and to prevent any risk of overheating, unlike the other part, namely the seat, which must be produced from iron, iron-nickel or copper in order to comply with the coefficients of expansion of the electronic control components.

The coefficients of expansion of the dissipator and seat are therefore different, the seat having a coefficient of expansion adapted to that of the control component, whilst the dissipator advantageously has a higher coefficient of expansion than that of the seat in order better to discharge the heat.

The dissipator is advantageously metallic, for example based on aluminium or as a variant magnesium or any other castable material discharging heat well. As a variant the dissipator is made of sintered metal.

This dissipator is an adaptation piece, which can thus have the required shape according to the application.

By virtue of the invention it is possible to standardise the seat and adapt the dissipator as a function of the application.

The solution according to the invention is effective because the two parts of the metallic heat dissipation means, namely the seat and dissipator, are adjacent, which makes it possible to discharge the heat well.

The solution is also simple because the control component and the heat dissipator are disposed on each side of the seat so that there is no need to provide a casing.

The stack consisting of control—seat—dissipator is therefore obtained simply and economically.

The seat, in contact with the ambient environment, constitutes one of the dissipators of the brush holder by virtue of the opening in the support making it possible to reduce the size locally at the level of the control component.

Advantageously, simply and economically, for good fixing, and in order to reduce the bulk, the support is moulded onto the seat and/or the dissipator.

Advantageously, in order to assist standardisation, the dissipator is attached to the support, for example removably by snapping on, screwing etc. This makes it possible to modify the brush holder as little as possible.

Advantageously, the dissipator is fixed by screws to the support, which is favourable for reducing the height of the dissipator whilst not reducing the efficacy thereof by increasing its width.

Advantageously, the brush holder comprises a thermally conductive layer interposed between the seat and the dissipator.

Advantageously, the seat and dissipator are in direct contact.

Advantageously, at least one from amongst the seat and dissipator has projecting reliefs able to enter the material of the other one amongst the seat and dissipator when they are placed in the operating position of the brush holder.

Thus good heat transmission is ensured between the seat and dissipator even if their mutual surface to surface contact is mediocre or even absent.

Advantageously, the dissipator is made from a lighter material than the seat, for example aluminium or any other material discharging heat well.

There is also provided according to the invention a vehicle electrical machine comprising a brush holder according to the invention.

In all cases the seat and dissipater are adjacent whilst being in direct or indirect contact, via a thermally conductive layer, so that a good transmission of heat is achieved. Likewise the control component is in direct or indirect contact, via a heat conductive layer, with the seat so that a good heat transmission is achieved.

Naturally the control component can be embedded in a resin providing a seal for it as described in the aforementioned documents U.S. Pat. No. 5,675,205 and EP-A-0 731 550.

It will be appreciated that, by virtue of the invention, there is much greater freedom than in the aforementioned two documents since the control component and dissipator extend on each side of the seat. One of the faces of the seat is dedicated to fixing the control component, whilst the other face is dedicated to the dissipator.

By virtue of the invention there are therefore many more possibilities, in particular with regard to the shapes and number of possible designs. For example, the size of the dissipator is not imposed by conditions of closure of a casing. The dissipator can therefore be mounted with clearance in the opening in the support. The cross-section of the dissipator can be any shape, for example round, rectangular or polygonal.

When the dissipator is fixed by screws as mentioned above, provision can be made for the or at least one of the screws for mounting the dissipator on the support also to provide the fixing of the brush holder on a housing of the machine, which makes it possible not to modify the brush holder.

Thus the screw or the same screws provide the fixing of the dissipator to the brush holder and the fixing of the brush holder to the machine.

Advantageously, a thermally insulating element is interposed between the or each screw and the dissipator.

Thus the transmission of heat is avoided from the housing to the dissipator via the screw or screws, which allow a subsequent removal of the dissipator.

It will be appreciated, when the dissipator is attached removably to the seat or to the support, that it is possible to standardise the brush holder to the maximum possible extent, which can thus be equipped with the dissipator as required.

The machine can be an alternator, an alternator/starter or a starter.

BRIEF DESCRIPTION OF THE DRAWINGS

Other characteristics and advantages of the invention will also emerge from the following description of four preferred embodiments given by way of non-limitative examples. In the accompanying drawings.

DETAILED DESCRIPTION OF THE PREFERRED EMBODIMENTS

Figure 1:
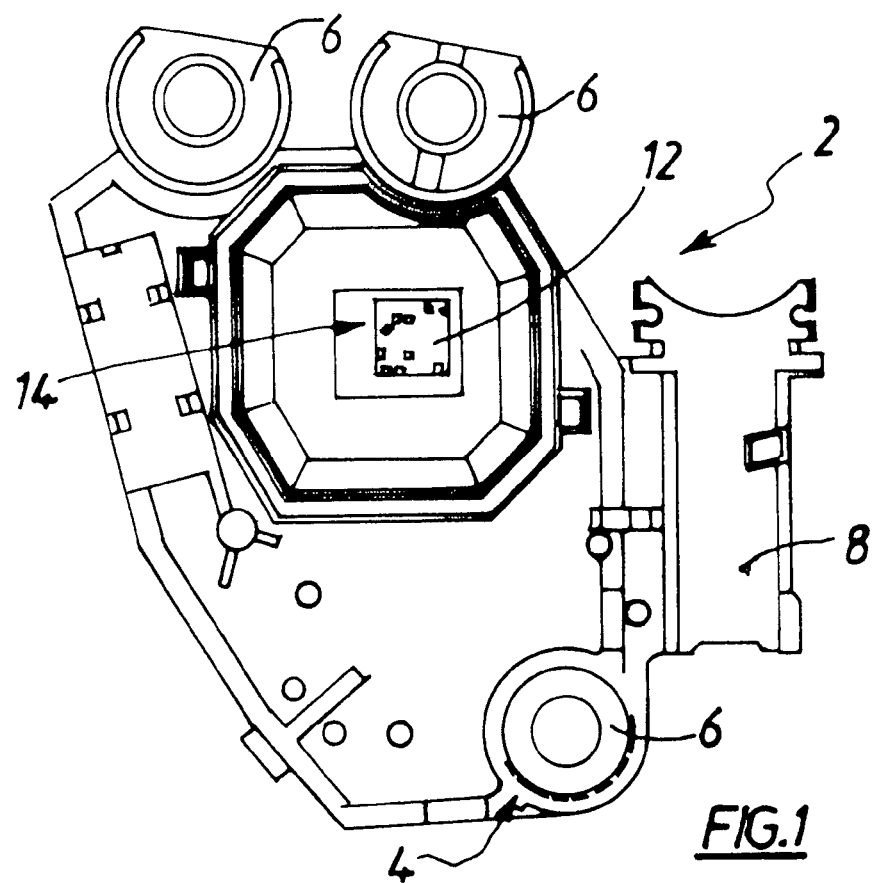
FIG. 1 is a plan view of a brush holder according to a first preferred embodiment of the invention.
Figure 2:
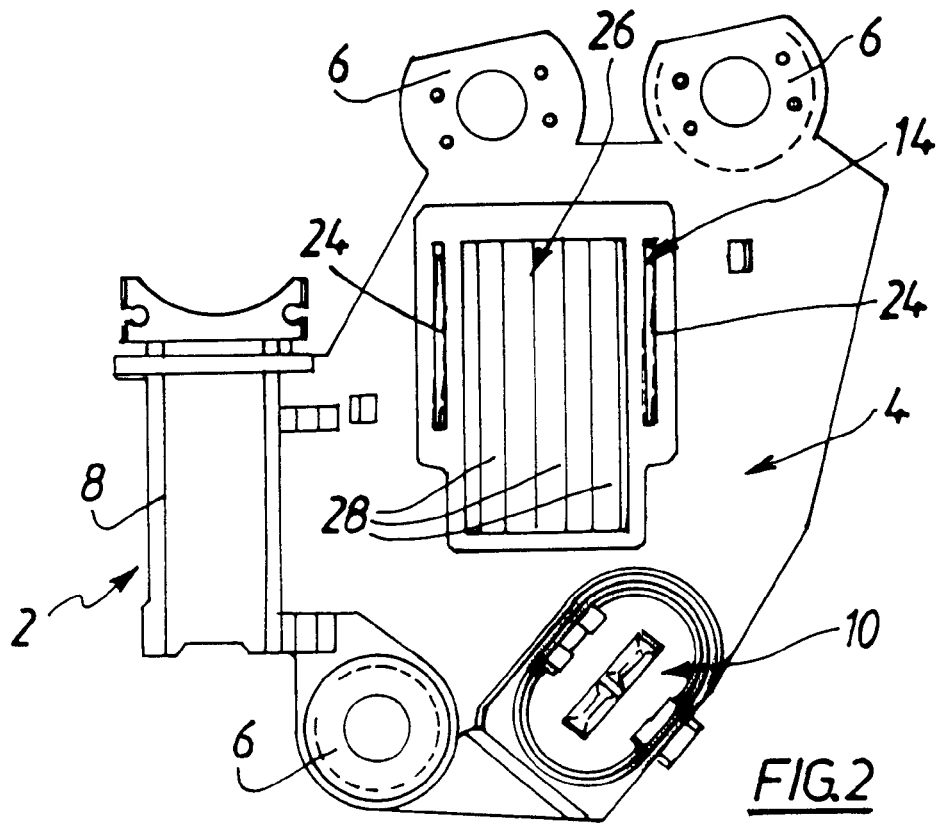
FIG. 2 is a view from below of the brush holder of FIG. 1.
Figure 3:
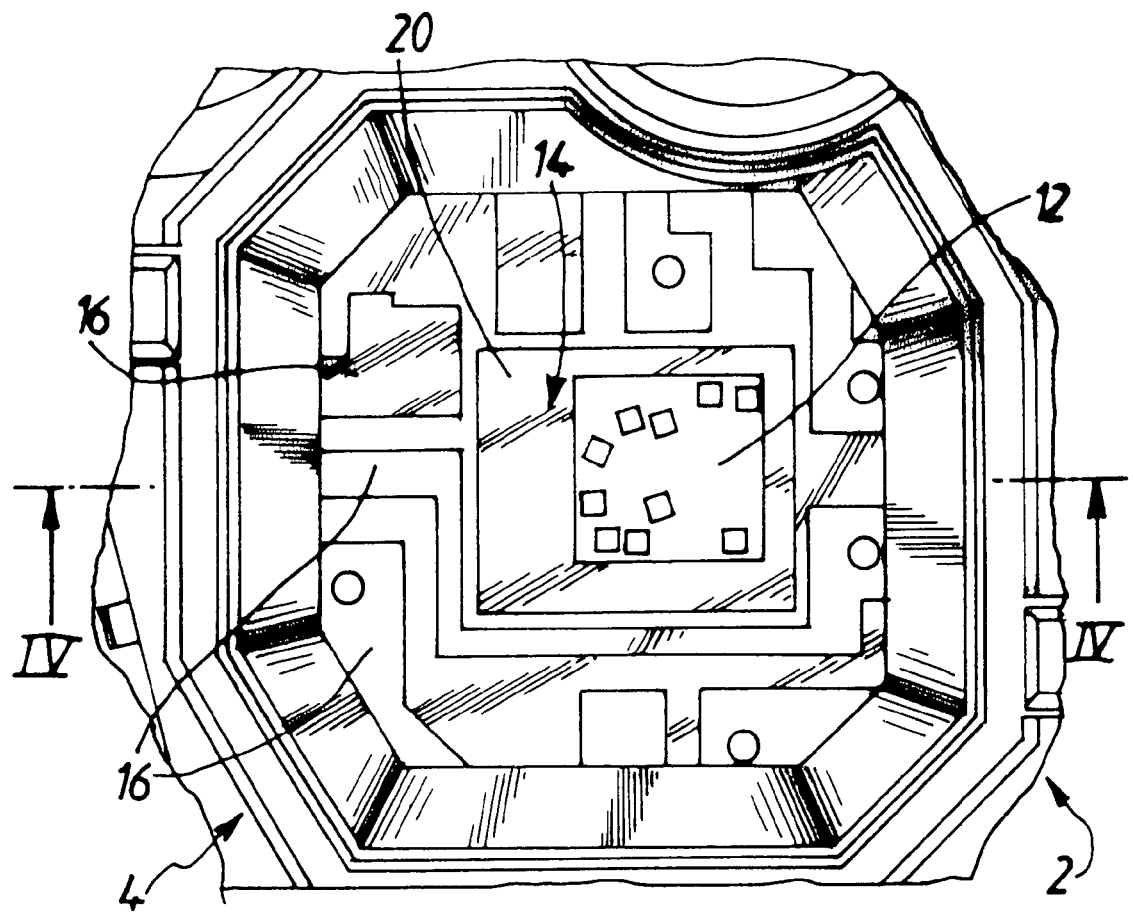
FIG. 3 is a view to a larger scale of a detail of FIG. 2.

In the figures the brush holder according to the invention is intended to equip an alternator or alternator/starter for a motor vehicle with an internal combustion engine.

As is known, an alternator has a housing provided with a front bearing and a rear bearing connected to each other, for example by screwing.

The housing carries on the inside a multiphase wound stator surrounding a rotor having at least one excitation winding.

The rotor is fixed to a shaft carrying at its front end a pulley and at the rear a collector having two collector rings connected to the ends of the excitation winding. The rear bearing serves as a support for a brush holder provided with brushes each intended to rub on a collector ring and to be connected to a control component forming in this case a voltage regulator. This regulator controls the power supply to the excitation coil of the rotor and is to connected to the rectifier bridge, usually with diodes, connected to the phases of the stator windings.

For more information reference should be made to the aforementioned document EP-A-0 731 550, the alternator conventionally being of the three-phase type.

The alternator functions as a generator and transforms mechanical energy into electrical energy.

The alternator is a rotary electrical machine which may be reversible and therefore also transform electrical energy into mechanical energy, notably in order to start the engine of the motor vehicle, the machine then being referred to as an alternator/starter.

For more information reference should be made to the document EP-A-0 792 769 describing an embodiment with a rectifier bridge provided with controlled switches, such as transistors of the MOSFET type, in order to create an alternator/starter.

In an alternator the rectifier bridge is conventionally carried by the rear bearing of the machine housing, whilst in an alternator/starter the rectifier bridge can be mounted outside the machine.

FIGS. 1 to 4 illustrate a first embodiment of the brush holder according to the invention, intended in this case for a motor vehicle alternator/starter. The brush holder 2 has an essentially flat support 4 made from electrically insulating plastics material, having orifices 6, here three in number, for fixing it to the machine housing, on the rear bearing thereof. The brush holder has a brush cage 8 containing brushes intended to come into contact with the collector rings of the collector of the machine. The brush holder has a connector 10 intended to receive a vehicle connection module. The brush holder has a semiconductor control component 12 of the ASIC (integrated circuit) or hybrid type known per se, and mentioned in the aforementioned documents U.S. Pat. No. 5,675,205 and EP-A-0 731 550. The component 12 is fixed to a metallic seat 14, possibly by means of a layer of glue which is a good heat conductor. The brush holder has metallic tracks or tongues 16 onto which the support 4 is moulded. The tongues 16 are connected to the component 12 by conventional wires 18, not illustrated. They are also connected to the other electrical elements of the circuit.

Figure 4:
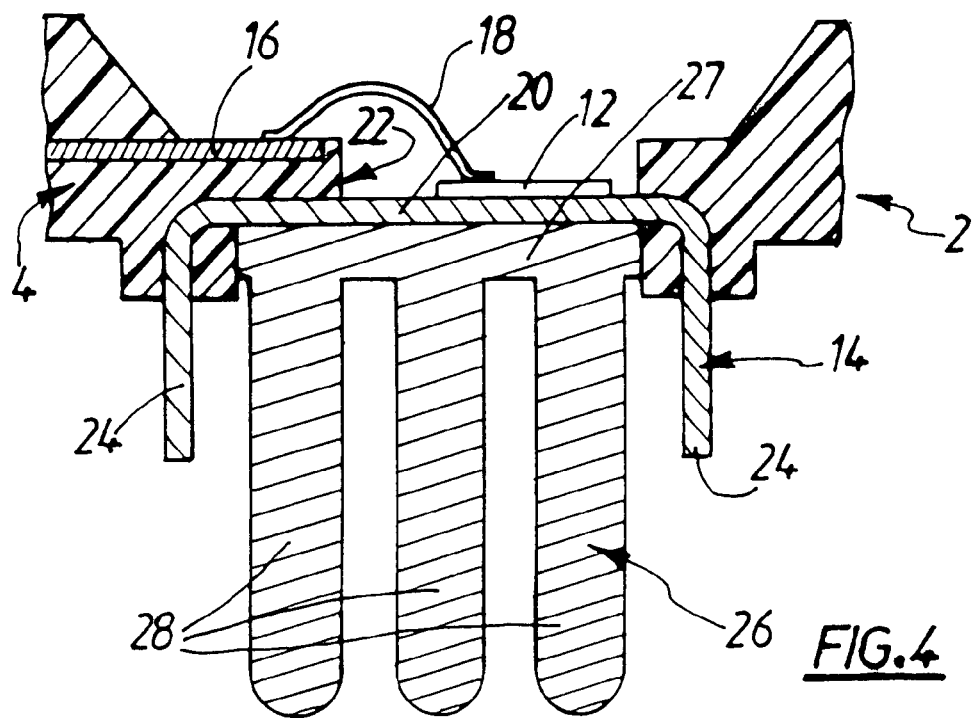
FIG. 4 is a view in section of the brush holder of FIG. 3 along the plane IV—IV.

As illustrated in FIG. 4, the seat 14 here has a U-shaped profiled form with a flat bottom 20. The seat results from the folding of a sheet of metal. A large portion of the bottom 20 essentially parallel to the plane of the support 4 extends in a through opening 22 in the support 4. The component 12 is fixed to the seat 14 in this opening. The seat has two flanks 24 parallel to each other, perpendicular to the bottom 20 and extending on one side of the bottom opposite to the component 12. The support 4 is moulded onto the seat so that the flanks 24 project from one face of the support over a larger part of their width and are immersed in the ambient air.

The metallic seat therefore belongs to a metallic heat dissipation means and is fixed to the electrically insulating support. The seat 14 receives for fixing on one of its faces the component 12 by means of an opening 22 closed by the seat. This seat has a coefficient of expansion adapted to that of the component and is produced for example from iron, iron-nickel or copper.

The heat dissipation means is in two distinct adjacent parts 14, 26, one of the parts consisting of the seat receiving on its other face a metallic heat dissipator forming the second part of the heat dissipation means.

In this figure the dissipator 26 is adjacent to the seat 14 whilst being in direct contact with it.

This brush holder has a profiled main dissipator 26 with three flat fins 28 parallel to each other and provided with a base 27. This dissipator is attached to the support 4, here by snapping on, so that its base 27 comes into surface contact with the face of the bottom 20 of the seat on the side opposite to the component 12 and the fins 28 extend parallel to the flanks 24 opposite these. The main dissipator 26 is made from aluminium. The fins 28 are thus immersed in the ambient air external to the machine.

This dissipator here has, according to one characteristic, a coefficient of expansion different from that of the seat and advantageously greater in order better to discharge the heat. The component 12 is housed in the thickness of the support 4 by means of the opening 22.

The dissipator 26 lies for the major part outside the support 4 on the side of the seat opposite to the component 12, the seat 14 being interposed between the component 12 and the dissipator 26.

The bottom 27 of the dissipator is housed in the thickness of the support. The maximum size of the bottom 27 is determined by the inside diameter of the opening 22, here circular in cross-section.

Because the dissipator is attached, here removably, to the seat by snapping on or, in a variant which is not shown, by screwing, it is possible to standardise the support and seat and mount the dissipator, of required size and shape, rapidly on the seat. Moulding the dissipator onto the seat is thus avoided. The outside diameter of the bottom 27 can be smaller than that in FIG. 4 and its height can be greater than that in FIG. 4. Everything depends on the application. The same applies with regard to the choice of the material and the shape of the dissipator.

Preferably, as visible in FIG. 4, the fins, forming cooling ribs 28, extend in projection with respect to the flanks 24 for better discharge of the heat.

The fins 28 are therefore higher than the flanks.

Naturally the dissipator can be attached to the bottom 20 by gluing, the glue being chosen so as to be a good heat conductor. Nevertheless, this arrangement is less favourable since the dissipator cannot be removed subsequently in order to replace it with a more suitable dissipator according to the conditions of use of the vehicle.

In all cases, the space available at the level of the support is occupied to the best possible extent.

By virtue of the moulding of the support 4 onto the seat the opening 22 can have a different size on each side of the seat.

The opening 22 is here stepped, its size being lesser at the level of the component 12 than it is at the level of the dissipator 26 shown with clearance in the opening 22.

In operation, the heat released by the component 12 is transmitted by contact to the bottom 20 of the seat, then to the flanks 24 of the seat and to the main dissipator. The latter provides the greater part of the evacuation of the heat released by the component. A small part of the heat is discharged by the flanks 24. The seat therefore serves as a secondary dissipator. The fins 28 and flanks 24 are cooled by the ambient air external to the machine.

Figure 5:
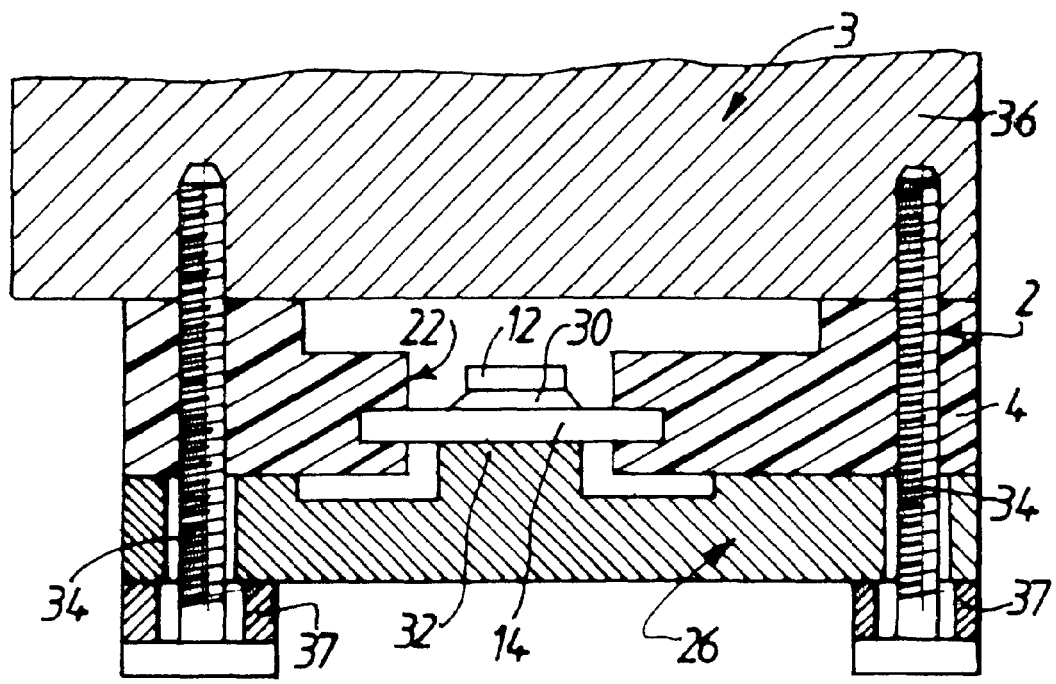
FIG. 5 is a view in section of a brush holder according to a second embodiment, fixed to the machine.

FIG. 5 illustrates a second embodiment. In this, the support 4 is again moulded onto seat 14, which here has a flat shape. The seat carries the component 12 by means of a layer of thermally conductive glue 30. The dissipator 26 here has an essentially flat shape. It is fixed to the support 4, parallel to it. The dissipator 26 has a protuberance 32 extending with clearance in the opening 22 and having a flat end face coming into surface contact with the face of the seat 14 opposite to the component 12, which is directed towards the machine. The machine has fixing screws 34 each passing through an orifice in the dissipator 26, an orifice in the support 4 and an orifice in a bearing 36 of the machine housing. Thus the same screws 34 provide the fixing of the dissipator 26 to the support 4 and the fixing of the support 4 to the machine 3.

The dissipator is less high than the one in FIG. 4 but is wider, which makes it possible to dissipate the heat well. The seat 14 is mounted in the thickness of the support, the protuberance 32 having an outside diameter less than the inside diameter of the opening 22.

The heat released by the component 12 is transmitted to the conductive glue 30 and then to the seat 14 and dissipator 26, which is immersed in the ambient air through its face opposite to the support. The dissipator could here also have fins.

The brush holder has thermally insulating washers 37, for example made from elastomer, interposed between the heads of the screws 34 and the dissipator 26, so that the heat from the bearing 36 transmitted to the screws is not transmitted to the dissipator. The dissipator could easily be designed so as to reduce its contacts with the stems of the screws.

As in FIG. 4 the dissipator can be fitted and removed as required.

Figure 6:
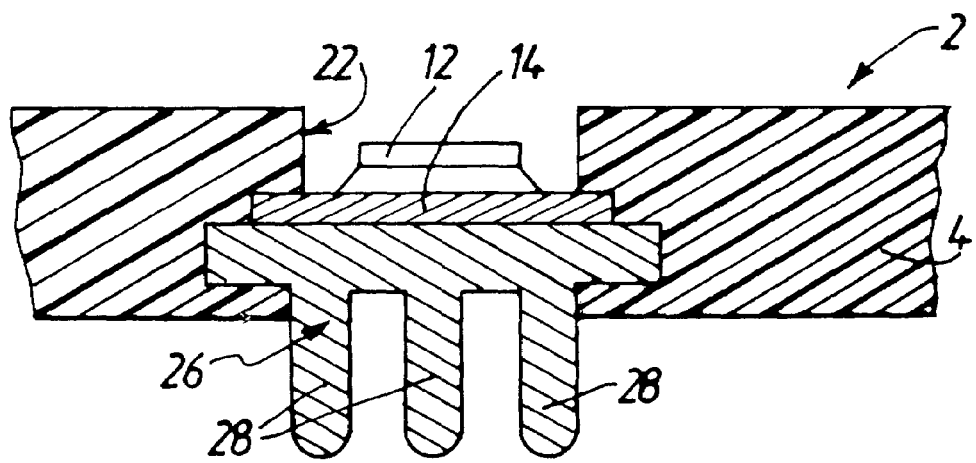
FIGS. 6 and 7 are detail views in section illustrating the third and fourth embodiments of the invention.

In the embodiment in FIG. 6, which is freely compatible with the two previous ones, the support 4 is moulded onto the seat 14 and onto the dissipator 26, which are thus by this means fixed in contact with each other.

In this case the bottom of the dissipator is broader than the seat 14.

Figure 7:
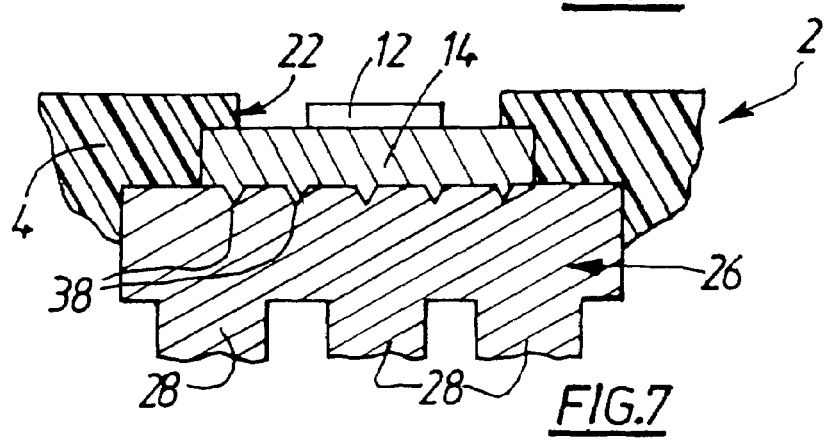

In the embodiment in FIG. 7, also freely compatible with the three previous ones, the seat 14 has on its face opposite to the component 12 sharpened reliefs 38 extending in projection. These reliefs enter the opposite face of the dissipator 26 when the seat is pressed against the broader dissipator. These reliefs 38 constitute heat bridges for discharging heat to the dissipator 26. At least some of the reliefs could be carried by the dissipator.

In each of these embodiments, a thermally conducting layer could be interposed between the seat and the dissipator.

As a variant the invention can be applied to a motor vehicle starter, the armature of which consists of the wound rotor and the inductor of the stator. In all cases the seat is housed by its bottom in the thickness of the support 4.

The dissipator can merely be made of plastics material containing metallic elements in order to discharge the heat well.

As a variant the seat can be fixed by gluing to the support.

The invention claimed is:

1. Brush holder (2) for a vehicle alternator having a housing with a bearing (36), said brush holder (2) comprising:
    an insulating support (4) having an opening (22);
    a heat dissipating means (14, 26) having a metallic seat fixed to the support (4);
    and an electrical circuit comprising a semiconductor control component (12), wherein the seat (14) receives for fixing on one of its faces the control component (12) within an opening (22) in the support (4) so that said control component (12) is fixed to the seat (14) at a position in said opening, and the seat (14) defines a part of the heat dissipation means (14, 26) which is in contact with an ambient environment and arranged so as to receive heat from the control component (12), and wherein the seat is separate from the bearing (36) and not in contact with said bearing (36), said seat is partially embedded within a thickness of the support (4) and the seat receives on the other of its faces a heat dissipator so that the heat dissipation means (14, 26) is composed of two distinct and adjacent parts.

2. Brush holder according to claim 1, wherein the support (4) is moulded onto the seat (14).

3. Brush holder according to claim 1, wherein the support (4) is moulded onto the dissipator (14, 26).

4. Brush holder according to claim 1, wherein the dissipator (26) is attached to the support (14).

5. Brush holder according to claim 4, wherein the dissipator (26) is fixed to the support (4) by screws (34).

6. Vehicle alternator, comprising: a brush holder according to claim 5, at least one of the screws (34) for mounting the dissipator (26) on the support (4) providing the fixing of the brush holder (2) to a housing of the machine, and a thermally insulating element (37) is interposed between the head of each screw (34) and the dissipator (36).

7. Brush holder according to claim 1, wherein it comprises a heat-conducting layer (30) interposed between the seat (14) and the dissipator.

8. Brush holder according to claim 1, wherein the seat (14) and the dissipator (26) are in direct contact.

9. Brush holder according to claim 8, wherein at least one (14) from amongst the seat (14) and dissipator (26) has projecting reliefs (38) able to enter the material of the other one (26) from amongst a base and dissipator when they are placed in the operating position of the brush holder.

10. Brush holder according to claim 1, wherein the dissipator (26) is metallic.

11. Brush holder according to claim 1, wherein the dissipator (26) has a coefficient of expansion greater than that of the seat.

* * * * *